(12) United States Patent
Becker et al.

(10) Patent No.: US 10,437,645 B2
(45) Date of Patent: Oct. 8, 2019

(54) SCHEDULING OF MICRO-SERVICE INSTANCES

(71) Applicant: SAP SE, Walldorf (DE)

(72) Inventors: Marc Becker, Mannheim (DE); Matthias Braun, Illingen (DE); Thomas Klink, Mörlenbach (DE); Marcel Merkle, Leimen (DE); Dietrich Mostowoj, Ludwigshafen (DE); Andreas Mueller, Brühl (DE); Johannes Scheerer, Heidelberg (DE); Andreas Schoesser, Karlsruhe (DE); Steffen Schreiber, Frankenthal (DE); Andreas Steiner, Ludwigshafen (DE); Silvestre Fernando Zabala, Wiesenbach (DE)

(73) Assignee: SAP SE, Walldorf (DE)

( * ) Notice: Subject to any disclaimer, the term of this patent is extended or adjusted under 35 U.S.C. 154(b) by 262 days.

(21) Appl. No.: 15/650,248

(22) Filed: Jul. 14, 2017

(65) Prior Publication Data
US 2019/0018709 A1  Jan. 17, 2019

(51) Int. Cl.
*G06F 15/173* (2006.01)
*G06F 9/50* (2006.01)
*H04L 12/24* (2006.01)

(52) U.S. Cl.
CPC ........ *G06F 9/5038* (2013.01); *H04L 41/5003* (2013.01); *G06F 9/5005* (2013.01); *G06F 9/5027* (2013.01); *G06F 9/5061* (2013.01)

(58) Field of Classification Search
CPC . H04L 41/5003; G06F 9/5038; G06F 9/5005; G06F 9/5027; G06F 9/5061
See application file for complete search history.

(56) References Cited

U.S. PATENT DOCUMENTS 6,119,155 A * 9/2000 Rossmann ............ G06F 3/0237
709/219
6,658,463 B1 * 12/2003 Dillon ............... H04L 29/12132
709/203

(Continued)

OTHER PUBLICATIONS

"Cloud Foundry", Wikipedia, retrieved from https://en.wikipedia.org/wiki/Cloud_Foundry on Jul. 13, 2017, last edited Jul. 7, 2017, 7 pages.

*Primary Examiner* — Jonathan A Bui
(74) *Attorney, Agent, or Firm* — Fountainhead Law Group P.C.

(57) ABSTRACT

Embodiments facilitate the efficient handling of service requests by a Platform-as-a-Service (PaaS) infrastructure. The platform may comprise a central controller communicating with a plurality of execution agents on one or more hosts. The central controller may parse client requests manipulating application state (e.g., scale, start, stop app, clear) into a sequence of fine-grained instance requests (e.g., start, stop, stop all, clear) that are distributed to the application program interfaces (API) of execution agents on the platform. The central controller may assign a priority to the fine-grained requests. The priority may take into consideration one or more factors including but not limited to: request creator (user, system); operation type (start, stop, stop all, clear); instance number; sequence number of the fine grained request within the original received request; hierarchy level (organization, space); and application. Fine-grained requests may be distributed by a scheduler to a queue of the execution agent.

20 Claims, 6 Drawing Sheets

(56) References Cited

U.S. PATENT DOCUMENTS

| | | | | |
|---|---|---|---|---|
| 6,816,907 | B1* | 11/2004 | Mei | H04L 29/06 |
| | | | | 709/225 |
| 6,996,645 | B1* | 2/2006 | Wiedenman | G06F 12/0831 |
| | | | | 710/107 |
| 7,574,538 | B1* | 8/2009 | Yochai | G06F 3/0613 |
| | | | | 710/36 |
| 2003/0028640 | A1* | 2/2003 | Malik | H04L 29/06 |
| | | | | 709/226 |
| 2011/0078703 | A1* | 3/2011 | Dokovski | G06F 16/9574 |
| | | | | 719/315 |
| 2013/0262556 | A1* | 10/2013 | Xu | G06F 9/5027 |
| | | | | 709/202 |
| 2013/0332927 | A1* | 12/2013 | Tang | G06F 9/45545 |
| | | | | 718/1 |
| 2018/0084081 | A1* | 3/2018 | Kuchibhotla | H04L 41/0816 |
| 2018/0210768 | A1* | 7/2018 | Dai | G06F 9/541 |
| 2018/0278675 | A1* | 9/2018 | Thayer | G06F 16/252 |
| 2019/0042276 | A1* | 2/2019 | Zhu | G06F 9/445 |

* cited by examiner

SCHEDULING OF MICRO-SERVICE INSTANCES

BACKGROUND

Unless otherwise indicated herein, the approaches described in this section are not prior art to the claims in this application and are not admitted to be prior art by inclusion in this section.

Increasingly, a plurality of different web applications may be hosted by a single platform having powerful processing and scalable storage capabilities. Such configuration is known as Platform-as-a-Service (PaaS).

The platform may represent a comprehensive environment for the development and execution of micro-service oriented applications. The platform may offer a rich set of services allowing end-to-end support for web-based applications, including persistency services and a configurable identity provider. Furthermore, the platform may support polyglot application development, with a core set of pre-deployed runtimes that are accepted as industry standards (e.g., node.js or JavaEE). Successfully coordinating the integration of one or more of these complex features, can pose a challenge for developers.

SUMMARY

Embodiments facilitate the efficient handling of service requests by a Platform-as-a-Service (PaaS) infrastructure. The platform may comprise a central controller communicating with a plurality of execution agents on one or more hosts. The central controller may parse client requests manipulating application state (e.g., scale, start, stop app, clear) into a sequence of fine-grained instance requests (e.g., start, stop, stop all, clear) that are distributed by a scheduler to application program interfaces (APIs) of execution agents.

The central controller may assign a priority to the fine-grained requests. The priority may reflect consideration of one or more factors including but not limited to:
creator (e.g., user or system) of the request;
operation type (e.g., start, stop, stop all, clear) of the request;
sequence number of the fine-grained request within an original received request;
level (e.g., organization, space) within the platform hierarchy;
Application the request targets.

The distributed requests may in turn be stored together with the assigned priority, in a request queue of the API of the assigned execution agent. A host may fix a limit to the thread pool configured to process requests in the queue. If the queue surpasses a configurable limit, the request is rejected. Stop and clear requests may not count against the limit. The platform may allow configuring a maximum number of start requests that are eligible for concurrent processing by an execution agent.

An embodiment of a computer-implemented method comprises receiving, on a platform infrastructure comprising a host, a request to manipulate a state of an application running on the platform infrastructure. The request is parsed into a fine-grained request. A priority is assigned to the fine grained request. The priority is stored. The fine grained request and the priority are distributed to an execution agent of the host to affect an instance of the application.

In certain embodiments the assigning the priority comprises affording a higher priority to the request manually received from an application user.

According to some embodiments the assigning the priority comprises affording a higher priority based upon a request type.

In particular embodiments the request type comprises stopping the instance.

In various embodiments the request type comprises starting the instance.

In some embodiments the assigning the priority comprises affording a higher priority based upon a lower number of the instance.

In various embodiments the platform infrastructure comprises a hierarchy, and the assigning the priority comprises affording a higher priority based upon a level in the hierarchy.

According to particular embodiments the request is from an organization, and the level comprises the organization.

In certain embodiments the level further comprises the application.

According to various embodiments the assigning is based upon an authorization role.

A non-transitory computer readable storage medium embodies a computer program for performing a method comprising, receiving on a platform infrastructure comprising a host, a request to manipulate a state of an application running on the platform. The request is parsed into a fine-grained request. A priority is assigned to the fine grained request based upon a request type. The priority is stored. The fine grained request and the priority are distributed to an execution agent of the host to affect an instance of the application.

An embodiment of a computer system comprises one or more processors and a software program executable on said computer system. The software program is configured to cause an in-memory database engine of an in-memory database within a platform infrastructure to receive, on the platform infrastructure, a request to manipulate a state of an application running on the platform infrastructure. The software program is also configured to cause the in-memory database engine to parse the request into a fine-grained request, to assign a priority to the fine grained request, and to store the priority in the in-memory database. The software program is further configured to distribute the fine grained request and the priority to an execution agent of the platform infrastructure to affect an instance of the application.

The following detailed description and accompanying drawings provide a better understanding of the nature and advantages of embodiments.

DETAILED DESCRIPTION

Described herein are methods and apparatuses implementing the scheduling of micro-service instances. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
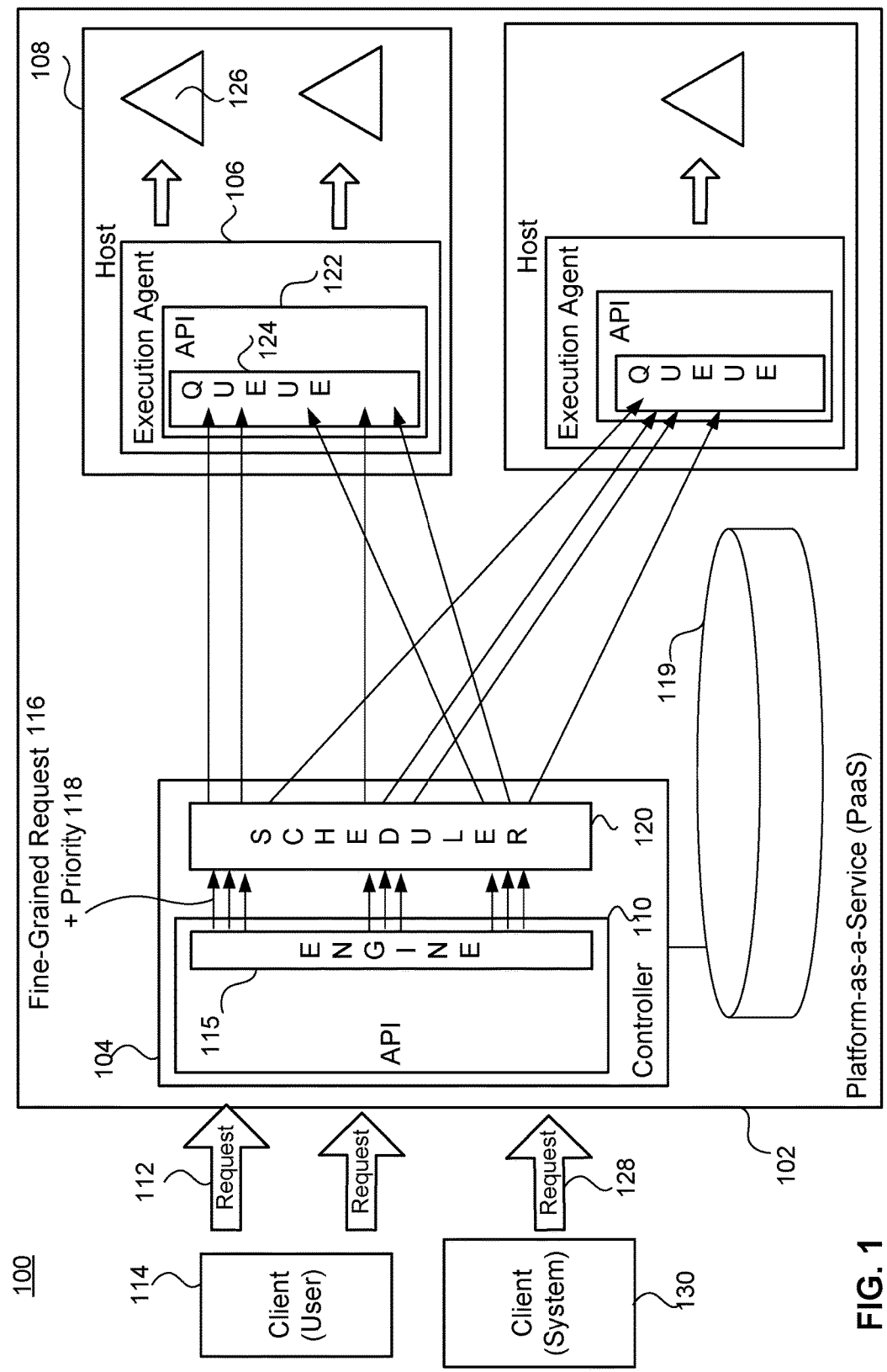
FIG. 1 shows a simplified diagram of a system according to an embodiment.

FIG. 1 shows a simplified view of a system configured to implement the scheduling of micro-service instances according to an embodiment. Specifically, system 100 comprises a Platform-as-a-Service (PaaS) infrastructure 102 featuring a central controller service 104 and a plurality of execution agents 106 that are present on hosts 108.

An Application Program Interface (API) 110 of the controller is configured to receive a request 112 from client 114. That request may be to manipulate a state (e.g., start, stop, scale) an application that is running on the PaaS infrastructure.

An engine 115 of the controller API receives this client request and parses it into a plurality of individual fine-grained requests 116. The engine then assigns a priority 118 to each of the fine-grained requests.

According to certain embodiments, the priority may comprise a multi-bit integer. As described below in connection with a specific example, respective fields within that integer may define priority components reflecting different considerations (e.g., request source, request type, instance number, hierarchy level, etc.)

These fine-grained requests and their corresponding assigned priorities are stored by the controller in memory 119 of the platform infrastructure. According to certain embodiments the memory may comprise a database, which in some cases may be an in-memory database—e.g., the HANA in-memory database available from SAP SE of Walldorf, Germany.

A scheduler component 120 of the controller then distributes the fine-grained requests along with their priorities, to an execution agent. This distribution may be based upon a round robin approach, although other scheduling approaches are possible.

The fine-grained request and priority from the controller are received at the API 122 of the execution agent. The request is placed into a request queue 124 in order to await execution to create or affect an application instance 126. That execution is dependent upon the priority assigned by the controller.

FIG. 1 shows that a different request 128 may be received by the controller API from a client 130 other than a human user of an application. For example, the system may automatically issue requests for tasks such as logging.

And while FIG. 1 shows the system client as being located outside of the PaaS infrastructure, this is not required. In certain embodiments the system client may be within the PaaS infrastructure, issuing requests of an internal nature.

The controller may be configured to recognize the creator of the request, and can accordingly assign a higher or lower priority based upon that creator. For example a routine system logging request may be afforded a lower priority than a manual request from an application user. This reduces delays in response time and desirably enhances the experience of the user.

While FIG. 1 shows the controller as being separate from the memory, this is not required. According to certain embodiments the one or more controller elements (e.g., API, engine, scheduler, balancer) may be implemented as part of the memory, for example leveraging the power available to an in-memory database engine.

Figure 2:
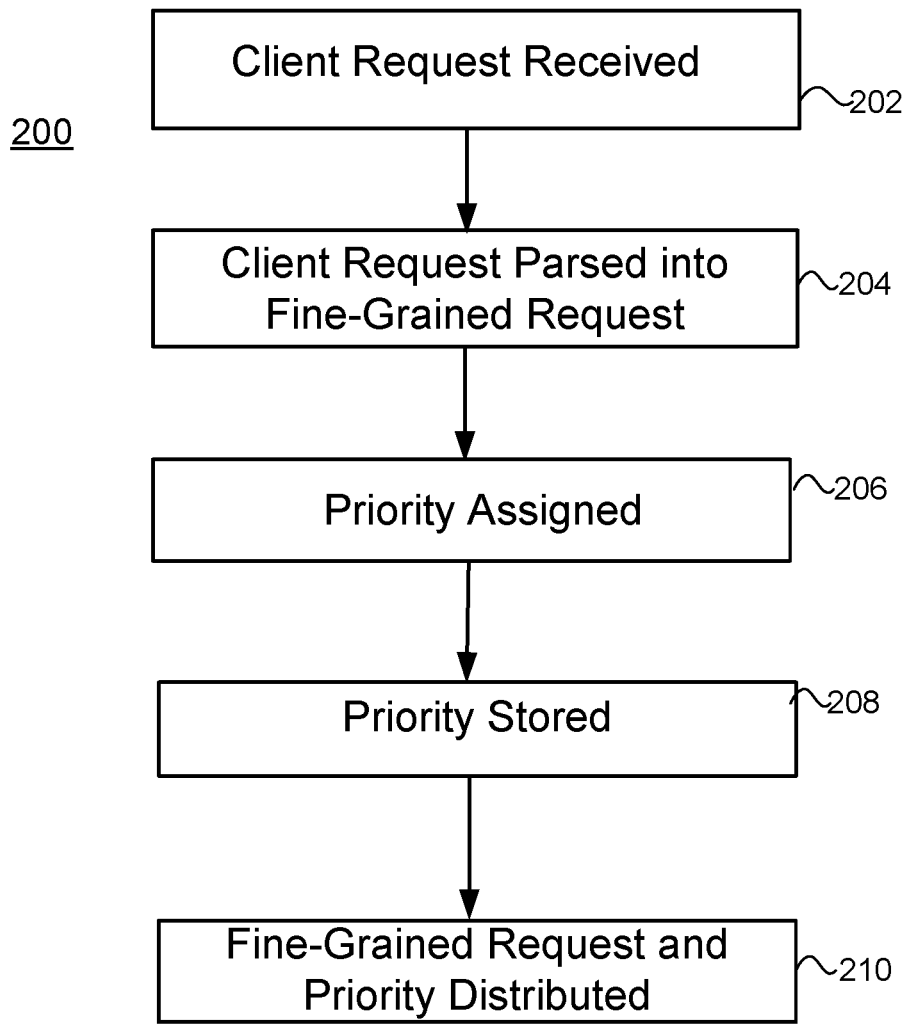
FIG. 2 shows a simplified flow diagram of a method according to an embodiment.

FIG. 2 is a flow diagram showing various actions taken in accordance with a method according to an embodiment. Specifically, at 202 a controller receives a request to manipulate an application state.

At 204 the request is parsed into a fine-grained request. At 206 a priority is assigned to the fine-grained request.

At 208 the priority is stored. At 210 the fine-grained request and the priority are distributed to an execution agent.

Figure 3:
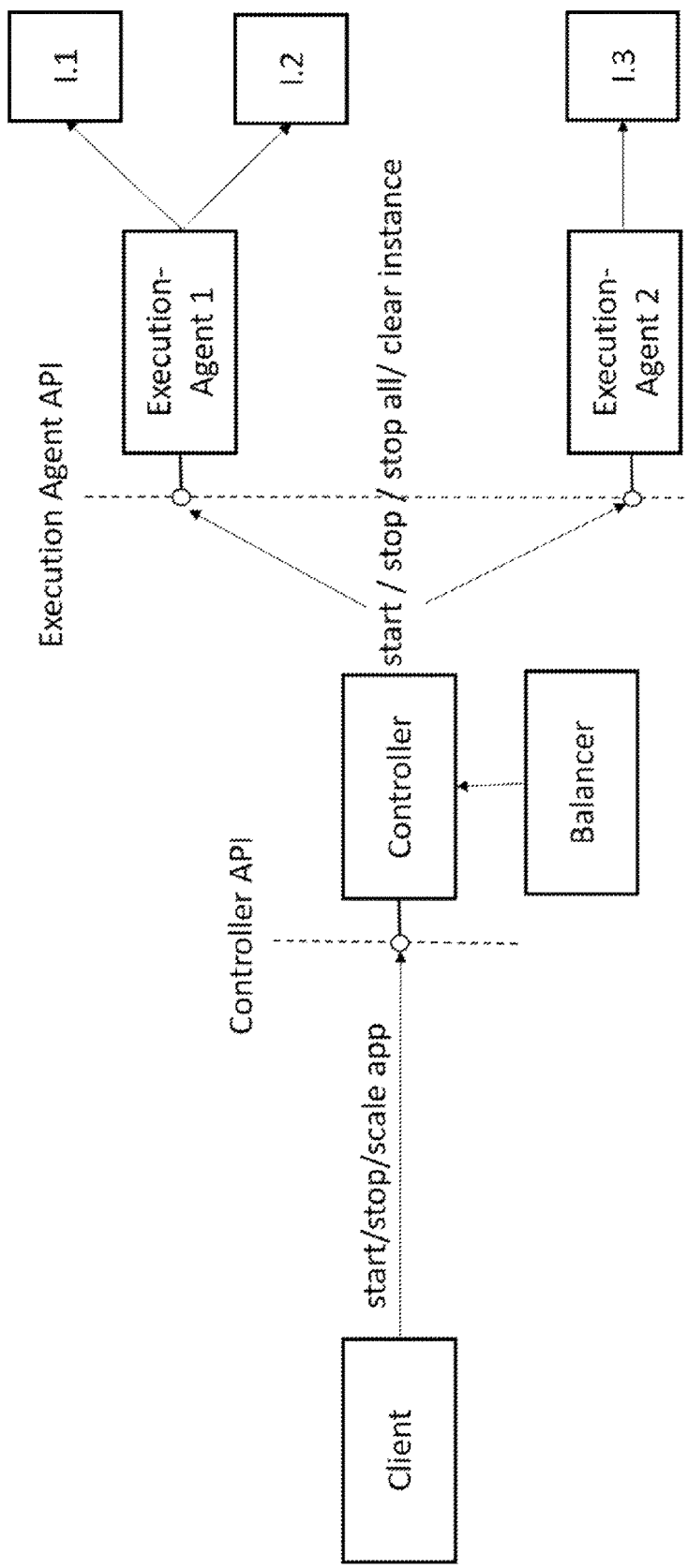
FIG. 3 shows an embodiment of a platform infrastructure according to an example.
Figure 4:
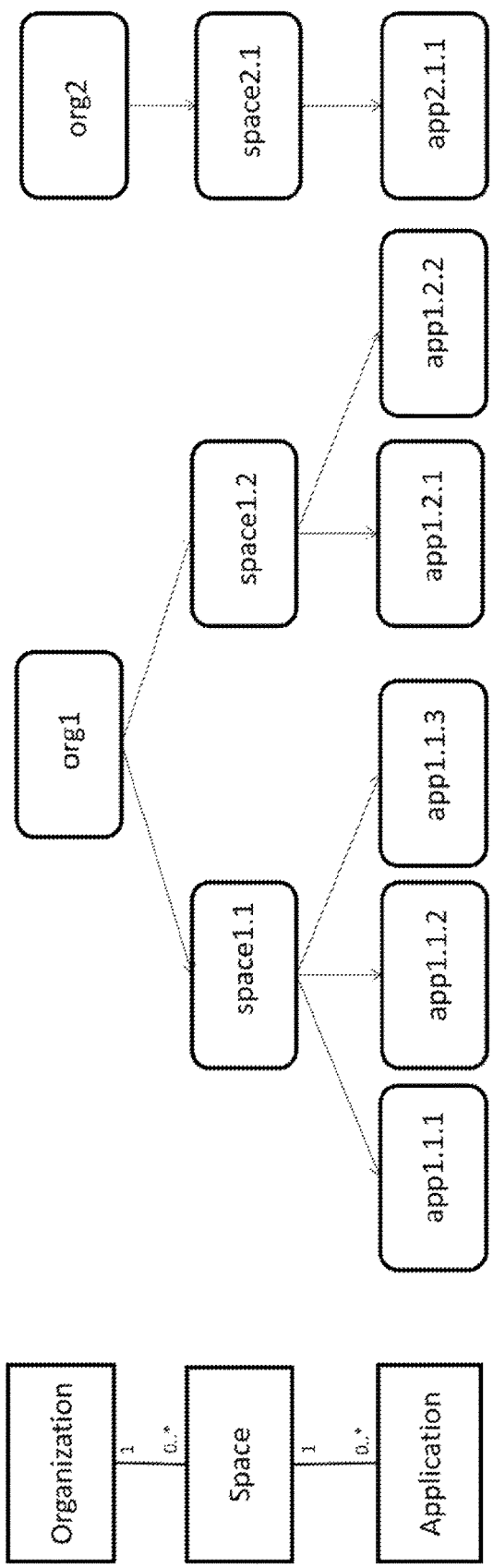
FIG. 4 shows the hierarchical organization of the platform of the example.

Various details of implementing the scheduling of micro-services instances according to particular embodiments, are now discussed specifically in connection with the example of FIGS. 3-4.

Example

An example is now provided in connection with the HANA extended application services, advanced model (XSA) PaaS platform available from SAP SE of Walldorf, Germany. The XSA platform allows for the comprehensive development and execution of micro-service oriented applications in an on premise environment.

FIG. 3 shows a simplified view of a platform infrastructure accordance with an embodiment. Specifically, the platform infrastructure comprises a Controller service including an API, controller engine, and balancer.

The controller API is configured to receive requests from a client. These requests may be to manipulate the state of an application, for example start, stop, scale app, etc. In response the Controller service is in turn configured to: parse the received requests into fine-grained requests, assign an individual priority to each of those fine-grained requests, and then distribute them to the APIs of various execution agents of the platform for processing.

Thus users seeking to deploy an application on this platform, push application artifacts (e.g. a java war file or a set of node modules) to the Controller service. Based on this application-specific data comprising the business logic, the platform infrastructure builds an executable binary image of a web server with the application being deployed on top. This executable binary image is known as a droplet.

This droplet is fetched by the Execution Agent, which starts a new process running the image (called an instance of the application). Users can scale the number of instances of an application in order to meet load requirements.

Embodiments according to this example relate to the manner in which the controller parses a client request manipulating an application state (e.g., scale, start, stop app, clear) into a sequence of instance requests that are in turn each assigned an individual calculated priority and distributed against the Execution Agent API (e.g., start, stop, stop all, clear).

The role of the Controller API is now discussed. The main entry point of the XSA platform is the Controller API providing an HTTP/REST interface that Clients can use for manipulating the state of an application. An application stores the number of desired instances.

Available high-level user operations regarding application instances at this endpoint include:

Start an application: i.e., starting the desired number of instances (target instance number);

Stopping an application: i.e., stopping all its running instances;

Scaling an application: i.e., adjusting the target number of instances up- or downwards; and Clear the instance's container after an instance has been stopped or crashed.

The role of the Execution Agent API is now discussed. To provide its API, the Controller makes usage of the HTTP/REST interface of one or more Execution Agents that may run on different hosts.

A variety of scheduling strategies are available for routing fine-grained requests to a particular Execution Agent. In this example, selecting a specific Execution Agent may involve choosing in a round robin fashion.

The Execution Agent API provides the following fine-grained operations on the instance level:

Start an instance: i.e., creating a container with the droplet's binary image and run it;

Stop an instance: i.e., stop the droplet execution;

Stop all instances of a droplet;

Clear an instance, i.e. remove the container artifacts (instance execution must be stopped).

Thus in FIG. 3, Execution Agent 1 has started the Instances I.1 and I.2.

Note that starting an instance is a relatively expensive request. In particular, such a Start request type includes: downloading the droplet, creating the container, and finally starting the instance. The Start request type binds resources like CPU-usage, I/O, and memory on a respectively high level.

The role of the balancing component is now discussed. In particular, the platform needs to make sure that the actual number of running instances for each application which meets the target number.

If an instance crashes for some reason, a balancing mechanism in the Controller will request an instance start at some Execution Agent to compensate the drop out. Similarly, when an Execution Agent gets unregistered from the system or has an outage, all its instances need to be restarted on a different Execution Agent.

The balance check in the Controller needs to be done on a regular basis (e.g., every 30 seconds) to keep service instance outages as short as possible. Consequently, not only manual requests by users are handled by Execution Agents, but also requests that were created automatically by the system.

The role of the model hierarchy is now discussed. In order to support separation on the design-time level, applications are created within spaces. Typically, all micro-service based applications making up a solution reside in the same space, and are developed and deployed by the same group of persons. As shown in FIG. 4, several different spaces may be assigned to the same organization (e.g. development area or company).

Isolation may be achieved by introducing a hierarchical authorization model based on various roles.

A user with role SpaceDeveloper for a specific space, may create or modify applications within this space.

A SpaceManager of a space may entitle SpaceDevelopers.

An OrganizationManager of an organization may create or modify spaces and entitle SpaceManagers for them.

A system Administrator may create or modify organizations, and entitle OrganizationManagers (and thus may modify the complete model).

While this example shows achieving model separation at deployment time by organizing applications in spaces and organizations as well as defining authorization roles, this is not specifically required. Embodiments may also be applicable to other hierarchy authorization models.

Resource considerations and request priorities are now discussed. Requests at the Execution Agent API introduce varying resource consumption (even Start requests may exhibit considerable variation depending on the size of application artifacts). On the other hand, there are typically a high number of SpaceDevelopers who push, start, and scale their applications in different spaces. Accordingly, a scheduling for the requests manages resource consumption.

Execution Agents have only limited resources to handle different instance operation requests in parallel. Consequently, a new request exceeding available limits would need to wait for other requests to finish before being processed by the Execution Agent.

This is especially true upon system startup, when all application instances are started initially on some Execution Agent. During this phase, manual requests are likely blocked until the initial balancing is processed (which can last for some minutes depending on the number of application instances).

It is further noted that applications may depend from each other (i.e., an application may need to call other application's service in order to provide a service.) This is especially true for applications that are provided by the platform by default—i.e., system applications (system services).

For example, the XSA server comes with an audit log service which can be accessed by user applications in order to centrally write audit logs. Starting such a system service as one of the final requests to an Execution Agent, will postpone the point of time when dependent user applications become ready for use following a system startup.

Accordingly, embodiments relate to a mechanism for executing micro-service requests that introduce a priority to define a dedicated order in which requests are executed.

Such priorities may satisfy one or more of the following seven (7) conditions.

1. Manual requests are processed and are not blocked by internal requests (i.e. not blocked by balancing cycles). Thus such user requests have acceptable response times.

2. Some request types have a higher priority than other request types independent from the affected instances. For example, clearing instances should have lower priority than starting new instances.

3. A SpaceDeveloper or SpaceManager user should be able to prioritize the request processing order of all application instances that refer to an owned space.

4. An OrganizationManager should be able to prioritize the request processing order of all application instances that refer to an owned organization.

5. An Administrator user should be able to prioritize the request processing order of all application instances. Thus, system applications can get highest priorities.

6. A request concerning the nth instance of an application should have higher priority than the mth instance of the application if n<m. Thus Controller requests affecting a number of instances (e.g., scale up or down) should be able to interfere with other requests.

7. Execution Agents may not run out of resources in case of high request frequency.

In order to decouple Controller requests (e.g., start, stop, stop all, or clear) from the actual processing of the request in an Execution Agent, each Execution Agent is arranged with a queue to receive new requests. According to the static limits of the dedicated host on which the Execution Agent is running, a static number of pool threads is configured to process the requests in the queue. If the queue exceeds a configurable number of requests, the request is rejected.

A maximum number of start requests for concurrently processing, may be configurably established. Stopping (all) and clearing, do not require further limits as given by the maximum pool threads.

Combining the request queue with the configurable maximum number of start requests, ensures that the resources for the Execution Agent can be statically bound to an upper limit.

Embodiments may further transform the high-level request at the Controller API into a sequence of fine-grained Execution Agent API requests being added to the request queue.

This may be accomplished as follows:

a. an application start request with n instances is transformed into n separate instance start requests of the corresponding droplet;
b. an application stop request is directly transformed into a 'stop all' instances (of a specific droplet) request;
c. an application (scale up to n instances/scale down to n instances) is transformed into n separate instance start/stop requests;
d. an application's instance clear request is directly transformed into a single clear instance request.

Transforming the higher-level Controller API requests into fine-grained Execution Agent requests, allows a user to interfere with concurrent Controller requests. In a specific example, User A starts 10 instances, and User B starts 10 instances. A single Execution Agent is able to process only five (5) instances concurrently.

Here, both requests at Controller API will come back approximately at the same time after the second start cycle. The Execution Agent will process the queue a9, b9, a8, b8, . . . , a0, b0 in two successive cycles.

According to embodiments, each Execution Agent API request is attached with a calculated priority value by the Controller. An exemplary calculation procedure is provided later below.

The calculated priority value is an integer greater than or equal to zero. A higher value denotes a higher request priority.

The Execution Agent's request queue is a priority queue taking the request priorities as sort criteria. The priorities allow later-posted requests to be processed earlier in the queue than earlier-posted requests having a lower priority.

Whenever a new request is to be added, the queue may be consolidated.

A 'stop all' request clears all stop and start requests of the same droplet residing in the queue.

A new stop request neutralizes a start request of the same droplet in the queue (i.e., both can be removed) and vice versa.

In an example, a request to manually start an application instance is processed directly in the Execution Agent even if there is a balancer cycle with a high number of instance requests posted automatically by the Controller. This assumes that manual start requests have a higher priority than automatic start requests in general.

In this particular example the final priority may be expressed as a 32-Bit integer. To calculate priority of an instance request at the Execution Agent API, the Controller considers following characteristics (with decreasing priority):

a. creation mode of the request: manually or automatically (1 Bit);
b. operation type of the request: start, stop, stop all, clear (2 Bit);
c. number of the request: in case the request is part of a sequence of fine-grained requests which comes from transforming a compound Controller API request (4 Bit);
d. priority of the application's organization: this can be set by administrators, and the default is zero (6 Bit);
e. priority of the application's space: this can be set by an administrator or corresponding manager, and the default is zero (8 Bit);
f. priority of the application: this can be set by an administrator, an OrganizationManager of corresponding organization, SpaceManager or SpaceDeveloper of corresponding space—the default is zero (11 Bit).

The calculated priority can be the 32-Bit integer represented by the following fields:

| Bit field(s) | #Bits | Value | Explanation |
|---|---|---|---|
| 32 | 1 | Mode:<br>manual = 1<br>automatic = 0 | Manual requests from application users are afforded higher priority than automatic system requests. |
| 31, 30 | 2 | Operation type:<br>stop all = 11<br>stop = 10<br>start = 01<br>clear = 00 | Requests stopping applications can free up execution resources for other requests, and hence are afforded a higher priority. |
| 29, . . . , 26 | 4 | If n is the total number of instances to be processed and i in range [1, . . . , n] is the index of current instance, the priority value is floor [(n − i − 1): n * 15] in range [0, . . . , 15]. | Requests affecting earlier created instances are afforded a higher priority. |
| 25, . . . 20 | 6 | The organization's priority in range [0, . . . , 63]. Default: 0. | Requests for certain organizations are afforded higher priority. |
| 19, . . . , 12 | 8 | The space's priority in range [0, . . . , 255]. Default: 0. | Requests for certain spaces are afforded higher priority. |
| 11, . . . , 1 | 11 | The application's priority in range [0, . . . , 2,047]. Default: 0. | Requests for certain applications are afforded higher priority |

By choosing the bit sizes as shown in the table, a system is capable of managing:

64 different organization priorities
256 different space priorities
2048 different application priorities If more priority levels are required, the priority value could be configured to a higher bit size (e.g., 64 bits).

From all unprocessed requests in an Execution Agent's queue, the request with the highest priority value will be taken as next request to be handled.

While the instant example describes a platform implemented utilizing the HANA in-memory database of SAP SE, embodiments are not limited to this or any other particular hierarchical PaaS configuration. Other such platforms may include but are not limited to: the Google App Engine available from Google of Mountain View, Calif.; Amazon Web Services available from Amazon of Seattle, Wash.; IBM BlueMix available from IBM of Armonk, N.Y.; Microsoft Azure available from Microsoft of Redmond, Wash., and the PaaS offerings Salesforce.com of San Francisco, Calif.

Figure 5:
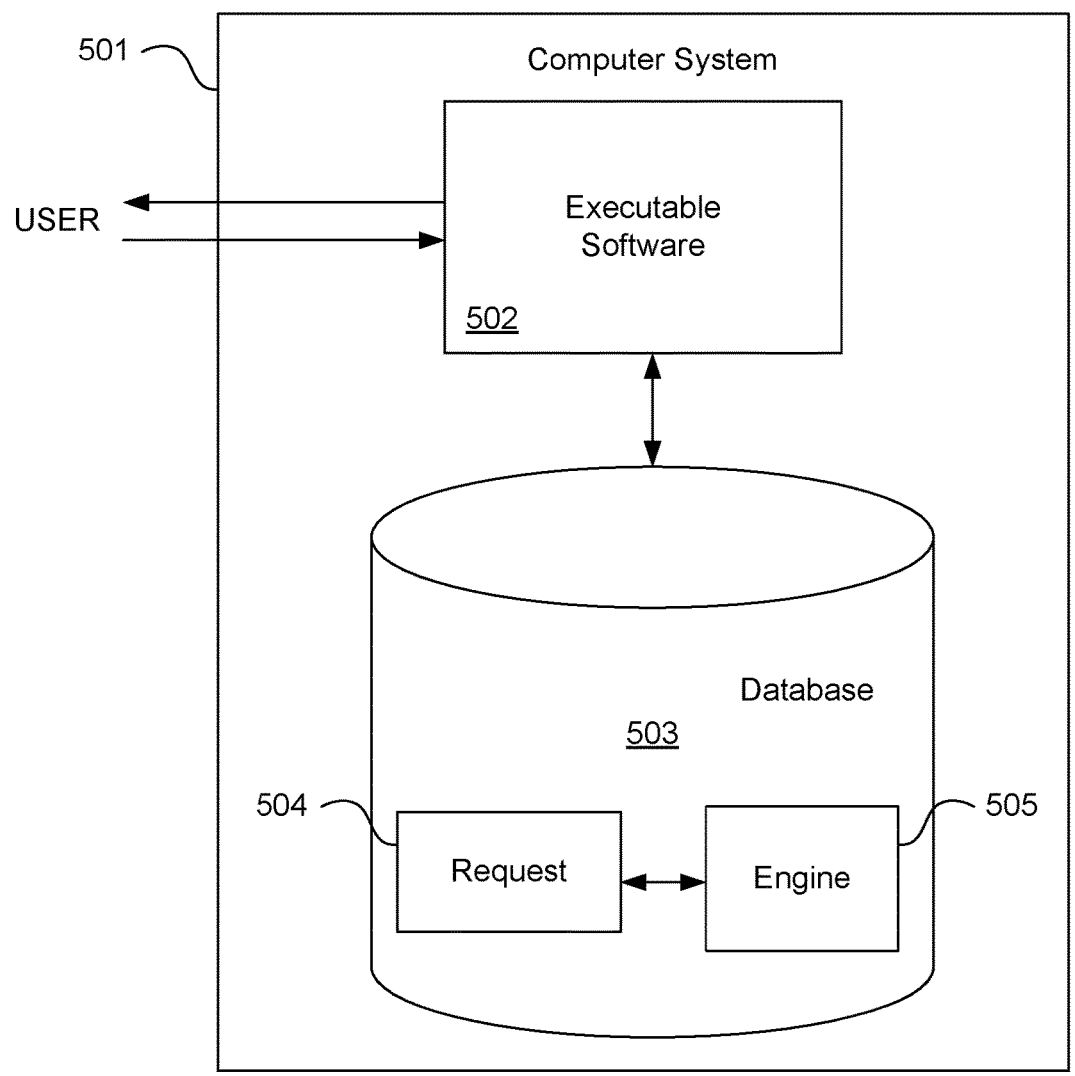
FIG. 5 illustrates hardware of a special purpose computing machine according to an embodiment that is configured to perform micro-service scheduling.

FIG. 5 illustrates hardware of a special purpose computing machine configured to implement scheduling of microservices instances according to an embodiment. In particular, computer system 501 comprises a processor 502 that is in electronic communication with a non-transitory computer-readable storage medium comprising a database 503. This computer-readable storage medium has stored thereon code 505 corresponding to an engine. Code 504 corresponds to a request. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
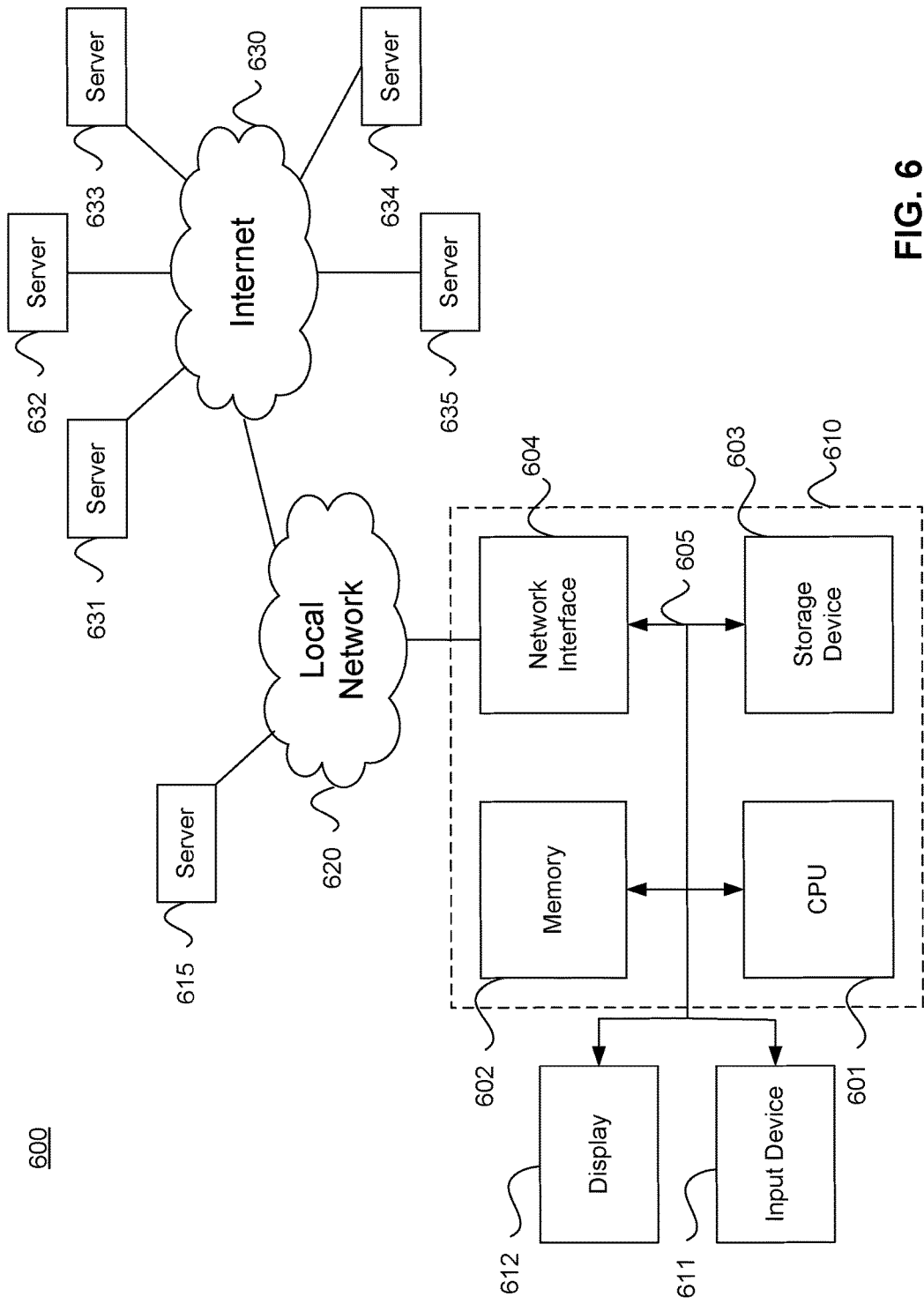
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 805 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving, on a platform infrastructure comprising a host, a request to manipulate a state of an application running on the platform infrastructure;
   parsing the request into a fine-grained request;
   assigning a priority to the fine-grained request;
   storing the priority; and
   distributing the fine-grained request and the priority to an execution agent of the host to affect an instance of the application.

2. A method as in claim 1 wherein the assigning the priority comprises affording a higher priority to the request when the request is manually received from an application user.

3. A method as in claim 1 wherein the assigning the priority comprises affording a higher priority based upon a request type.

4. A method as in claim 3 wherein the request type comprises stopping the instance.

5. A method as in claim 3 wherein the request type comprises starting the instance.

6. A method as in claim 1 wherein the assigning the priority comprises affording a higher priority based upon a lower number indicating that the instance is an earlier created instance of the application.

7. A method as in claim 1 wherein:
   the platform infrastructure comprises a hierarchy; and
   the assigning the priority comprises affording a higher priority based upon a level in the hierarchy.

8. A method as in claim 7 wherein:
   the request is from an organization; and
   the level comprises the organization.

9. A method as in claim 8 wherein the level further comprises the application.

10. A method as in claim 1 wherein the assigning is based upon an authorization role.

11. A non-transitory computer readable storage medium embodying a computer program for performing a method, said method comprising:
   receiving, on a platform infrastructure comprising a host, a request to manipulate a state of an application running on the platform;
   parsing the request into a fine-grained request;
   assigning a priority to the fine-grained request based upon a request type;

storing the priority; and distributing the fine-grained request and the priority to an execution agent of the host to affect an instance of the application.

12. A non-transitory computer readable storage medium as in claim 11 wherein the priority is higher where the request type stops the instance.

13. A non-transitory computer readable storage medium as in claim 11 wherein the priority is higher where the request type starts the instance.

14. A non-transitory computer readable storage medium as in claim 11 wherein the priority is higher where the request type scales the application.

15. A non-transitory computer readable storage medium as in claim 11 wherein:

the platform infrastructure comprises a hierarchy; and the assigning the priority comprises further comprises affording a higher priority based upon a level in the hierarchy.

16. A computer system comprising:

one or more processors;

a software program, executing on said computer system, the software program configured to cause an in-memory database engine of an in-memory database within a platform infrastructure to:

receive, on the platform infrastructure, a request to manipulate a state of an application running on the platform infrastructure;

parse the request into a fine-grained request;

assign a priority to the fine-grained request;

store the priority in the in-memory database; and distribute the fine-grained request and the priority to an execution agent of the platform infrastructure to affect an instance of the application.

17. A computer system as in claim 16 wherein the software program is further configured to cause the in-memory database engine to afford a higher priority to the request when the request is manually received from an application user.

18. A computer system as in claim 17 wherein:

the platform infrastructure comprises a hierarchy; and the software program is configured to cause the in-memory database engine to afford a higher priority based upon a level in the hierarchy.

19. A computer system as in claim 17 wherein the software program is configured to cause the in-memory database engine to afford a higher priority based upon a lower number indicating that the instance is an earlier created instance of the application.

20. A computer system as in claim 17 wherein the software program is configured to cause the in-memory database engine to assign the priority based upon an authorization role.

* * * * *